United States Patent [19]
Dutton

[11] 3,781,642
[45] Dec. 25, 1973

[54] D.C.-D.C. POWER SUPPLY WITH STABILIZATION

[75] Inventor: David R. Dutton, North Billerica, Mass.

[73] Assignee: Honeywell Information Systems Inc., Waltham, Mass.

[22] Filed: Nov. 6, 1972

[21] Appl. No.: 304,183

[52] U.S. Cl. .............................. 321/43, 323/22 T
[51] Int. Cl. ............................................ H02m 7/52
[58] Field of Search ...................... 321/43; 323/22 T

[56] References Cited
UNITED STATES PATENTS

| | | | |
|---|---|---|---|
| 3,305,767 | 2/1967 | Beihl et al. | 323/22 T |
| 3,600,666 | 8/1971 | Gliever | 323/22 T |
| 3,378,758 | 4/1968 | Goodenow | 323/22 T |
| 3,356,930 | 12/1967 | Lupoli et al. | 323/DIG. 1 |
| 3,414,774 | 12/1968 | Motta | 317/33 V |

*Primary Examiner*—William M. Shoop, Jr.
*Attorney*—William W. Holloway, Jr. et al.

[57] ABSTRACT

A. d.c.-d.c. power supply in which electric current is delivered to an output terminal through an inductance. Current is delivered to the output terminal from a power source when electronic switching elements are in an "on" state and through a diode element when the electronic switching elements are in an "off" state. A feedback circuit compares the voltage at the output terminal with a reference voltage to establish the state of the electronic switching elements. Immediately after changing the state of the electronic switching elements, the feedback circuit is rendered temporarily insensitive to transient voltage spikes resulting from the change of state of the switching elements.

11 Claims, 3 Drawing Figures

D.C.-D.C. POWER SUPPLY WITH STABILIZATION

BACKGROUND OF THE INVENTION

1. Field of the Invention

This invention relates generally to electronic power supplies and more particularly to the class of power supplies which are energized by a d.c. input power source.

2. Description of the Prior Art

To provide a regulated d.c. output voltage from a d.c. input source (of greater potential), it is known in the prior art to provide a nearly constant voltage across a capacitor by periodically or continuously restoring the charge of the capacitive element. It is also known in the art to provide a resistance between the source voltage and the capacitor. The resistance can be a resistor allowing a constant predetermined current to be supplied to a fixed load, a dropping resistor supplying the current to a constant voltage device (i.e. such as a Zener diode) coupled across the capacitor, a portion of a resistance dividing network in which the current required by the load is a negligible portion of the network current, or a variable resistance, comprised of electronic components regulated by appropriate feedback circuits. However, the use of the resistance in the above described circuits produces a continuing source of power loss which may be unacceptable in many applications.

It is also known in the prior art to replenish the charge stored in a capacitor element by periodically activating switching elements. A voltage source provides a reference voltage, and when excursions of the supply output voltage, relative to a reference voltage, reach a predetermined value, the switches are changed to the opposite state of conductivity, under control of the feedack circuits. However, activation of the switching elements frequently causes transient voltage spikes at the output terminal which, because of the feedback path, tends prematurely to reverse the state of the switches. The transient effects, in addition to unnecessary and even harmful activation of the switching elements, results in increased power loss because of the tendency for the switches to remain in an intermediate region, between a fully conducting ("on") state and a fully non-conducting ("off") state.

It is therefore and object of the present invention to provide an improved d.c. to d.c. power supply.

It is another object of the present invention to provide a d.c. to d.c. power supply with low power losses.

It is a further object of the present invention to provide a feedback path which is relatively unaffected by voltage transients resulting from activation of switching elements.

It is a still further object of the present invention to provide a feedback circuit with variable sensitivity, the feedback circuit being relatively insensitive to voltage spikes immediately after switching and becoming increasingly sensitive to voltage transients thereafter.

It is still another object of the present invention to provide a power supply which charges a capacitance by periodically activating and de-activating switching elements, controlled by the action of a feedback circuit, and wherein the voltage transients directly resulting from changes in the conductivity of the switching elements are prevented from affecting the state of conductivity of the switching elements.

SUMMARY OF THE INVENTION

The aforementioned and other objects are accomplished, according to the present invention by a power supply including a switching element for coupling and de-coupling a power source to a storage capacitor, an inductive impedance for assuming a major portion of the potential drop between power source and the storage capacitor without providing a source of power loss, and a feedback network for controlling the switching elements based on the potential across the storage capacitor. The feedback network determines the state of conduction or non-conduction of the switching elements and causes that state to be reversed when the excursion from a reference voltage is sufficiently large. The feedback network is rendered temporarily insensitive to voltage changes across the storage capacitor immediately after the change in state of the switching elements, thereby reducing the effects of undesirable transient voltages.

These and other features of the invention will be understood upon reading of the following description along with the drawings.

DESCRIPTION OF THE PREFERRED EMBODIMENT

DETAILED DESCRIPTION OF THE FIGURES

Figure 1:
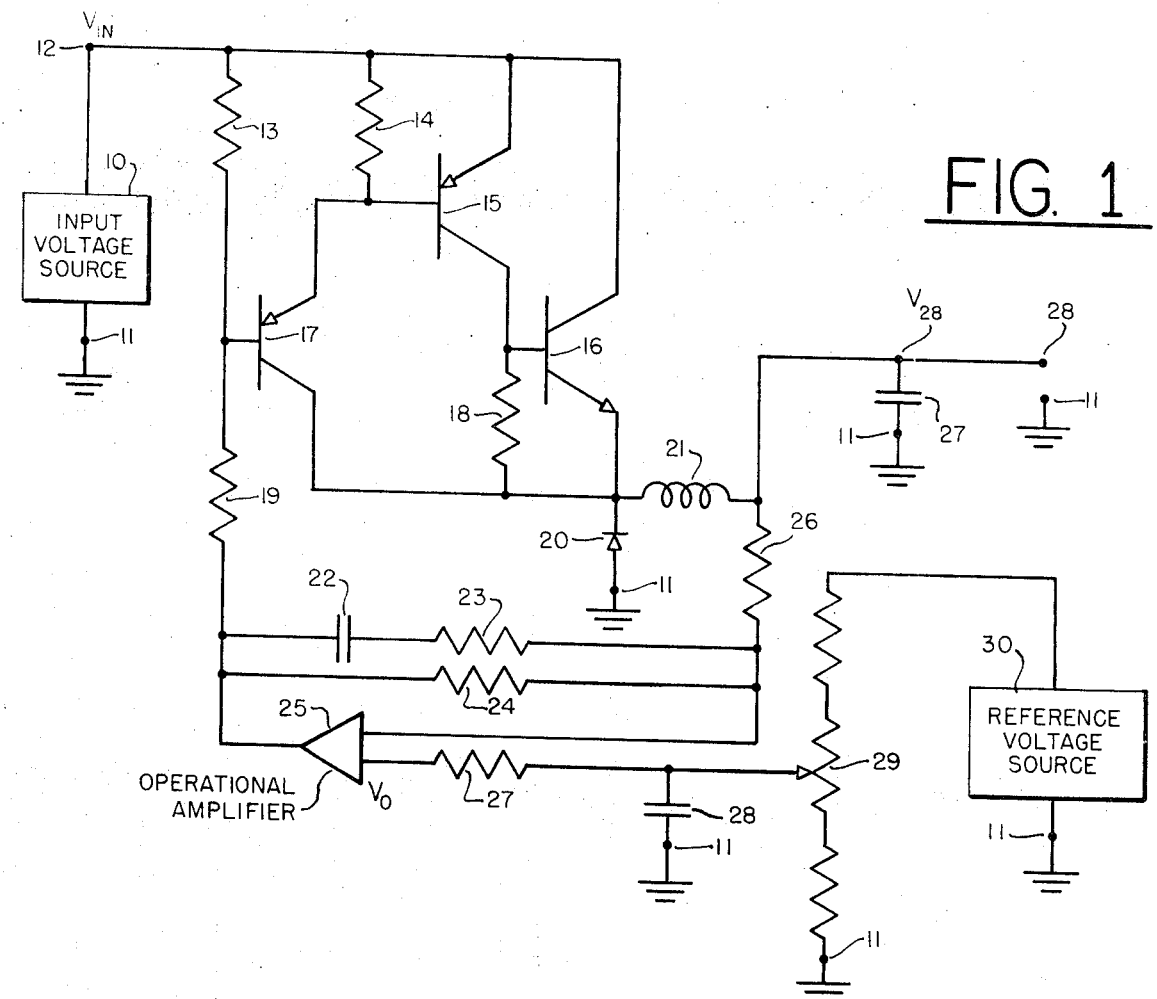
FIG. 1 is a schematic circuit diagram of the d.c.—d.c. power supply.

Referring first to FIG. 1, an Input Voltage Source 10 is coupled between Input Terminal 12 and a Common Terminal 11. Input Terminal 12 is coupled to a first terminal of Impedance 13, a first terminal of Impedance 14, an emitter terminal of pnp Transistor 15 and a collector terminal of npn Transistor 16. A second terminal of Impedance 14 is coupled to a base terminal of Transistor 15 and an emitter terminal of pnp Transistor 17. A collector terminal of Transistor 15 is coupled to a base terminal of Transistor 16 and one terminal of Impedance 18. A collector terminal of Transistor 17, a second terminal of Impedance 18, an emitter terminal of Transistor 16, and a cathode terminal of Diode 20 are coupled to a first terminal of Impedance 21. Transistors 15 and 16 are power transistors which act as a switching element, alternatively assuming a conducting and a non-conducting state between Input Voltage Source 10 and Impedance 21.

A second terminal of Impedance 13 is coupled to a base terminal of Transistor 17 and a first terminal of Impedance 19. A second terminal of Impedance 19 is coupled to an output terminal of Operational Amplifier 25, a first terminal of Impedance 22 and a first terminal of Impedance 24. The output voltage of Operational Amplifier 25 along with Transistor 17 provides the control elements for the switching of the power Transistors 15 and 16.

One input, or control terminal, of Operational Amplifier 25 is coupled to a first terminal of Impedance 26, to a second terminal of Impedance 24 and, through Impedance 23, to a second terminal of Impedance 22. Impedances 22, 23, and 24 comprise feedback circuits for Operational Amplifier 25.

A second input terminal of Operational Amplifier 25 is coupled through Impedance 22 to a first terminal of Impedance 28 and to an output terminal of a variable Resistance Dividing Network 29. A second terminal of Impedance 28 is coupled to Common Terminal 11. Resistance Dividing Network 29 is coupled between one terminal of Reference Voltage Source 30 and Common Terminal 11. A second terminal of Reference Voltage Source 30 is coupled to Common Terminal 11. The Reference Voltage Source 30 and the Resistance Dividing Network 29 provide Operational Amplifier 25 with a Reference Voltage $V_0$ for establishing the voltage value at which switching of the power transistors takes place Impedance 28 provides a high frequency filter. In the preferred embodiment, Reference Voltage Source 30 is a Zener diode and can be included as an integral element of Operational Amplifier 25 (such as in the Fairchild Operational Amplifier A723).

A second terminal of Impedance 21 is coupled to a second terminal of Impedance 26, to Supply Output Terminal 28 and through Impedance 27 to Common Terminal 11. The anode of Diode 20 is coupled to Common Terminal 11.

Figure 2:
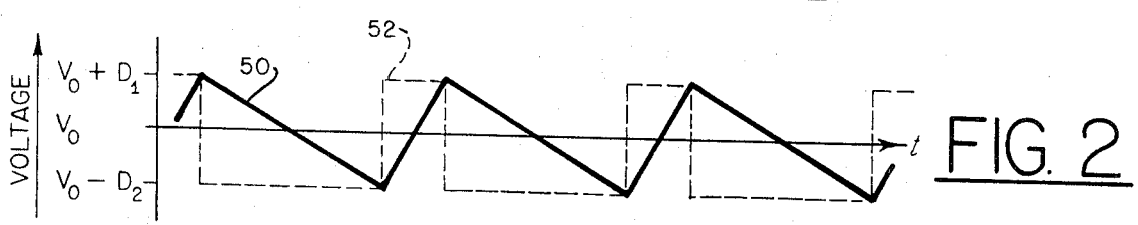
FIG. 2 is a comparison of the actual voltage waveform (solid curve) at the d.c.—d.c. power supply output terminal with the voltage waveform (dashed line) at the output terminal needed to cause a change in the state of conduction of the switching elements as a function of time with variable feedback present.

Referring next to FIG. 2, Output Voltage Waveform 50 ($V_{28}$) at Supply Output Terminal 28 is shown as a function of time by the solid curve. Reference Voltage $V_0$ establishes the voltage value about which the regulation of the Output Voltage $V_{28}$ takes place. The dashed line curve 51 shows the Output Voltage $V_{28}$ necessary in the prior art to produce a change in the conductivity of the switching elements. $V_0 + D_1$ is the Output Voltage level above which the switching element in a conducting state will be changed to a non-conducting means. $V_0 - D_2$ is the Output Voltage level below which the switching elements in the non-conducting state will be changed to a conducting state.

Figure 3:
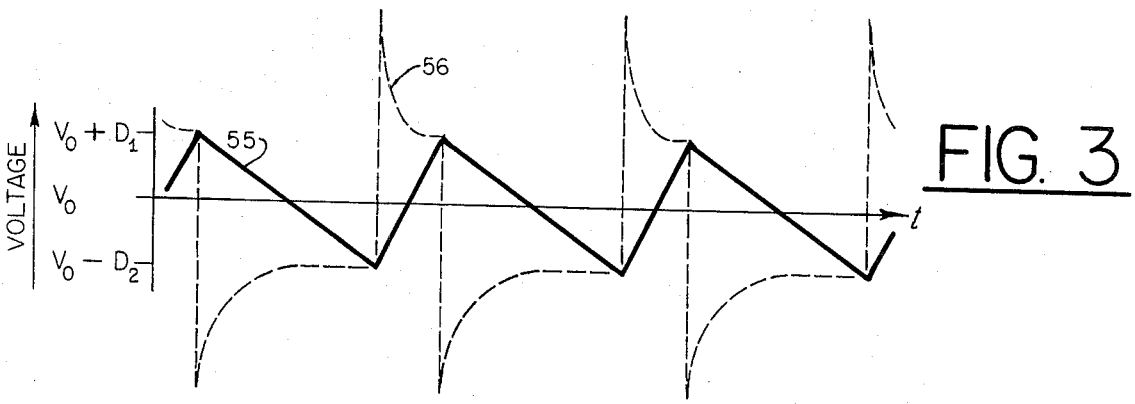
FIG. 3 is a comparison of the actual voltage waveform (solid curve) at the d.c.—d.c. power supply output terminal with the voltage waveform (dashed line) at the output terminal needed to cause a change in the state of conduction of the switching elements as a function of time with variable feedback present.

Referring next to FIG. 3, Output Voltage Waveform 55 ($V_{28}$) at Supply Output Terminal 28 is shown as a function of time by the solid curve. Reference Voltage $V_0$ establishes the voltage value about which the regulation of the Output Voltage $V_{28}$ takes place. The dashed line 56 shows the Output Voltage $V_{28}$ necessary in the present invention to produce a change in the conductivity of the switching element $V_0 + D_1$ and $V_0 - D_2$ are similar to the definition of FIG. 2. However, in the present invention, a large swing in the voltage value necessary to change the state of conductivity of the switching elements takes place immediately after a change of state of the conductivity. The voltage levels $V_0 + D_1$ and $V_0 - D_2$ are the approached asymptotically in a period determined by the time constant of the system.

In FIG. 2 and FIG. 3, $D_1$ and $D_2$ are shown to be approximately equal to facilitate understanding of the operation. In the preferred embodiment, these values can be unequal as will be clear to one skilled in the art. Similarly, the voltage curves 50 and 55 are only approximately linear, and depend on the values of the circuit components. Finally, the magnitude of the exponential charge and discharge, decay portions of the curve 56 as well as the decay time constant, are established by the circuit components.

OPERATION OF THE PREFERRED EMBODIMENT

The d.c.—d.c. or switching power supply is arranged to maintain a charge on a storage capacitor (Impedance 27) coupled between Output Terminal 28 and the Common Terminal 11. The charge is delivered to Impedance 27 through an inductance, Impedance 21. Transistors 15 and 16 are power transistors which are functionally electronic switches. When the transistors are in a conducting or "on" state, charge is delivered from Input Voltage Source 10 through Impedance 21 to Impedance 27. When the Power Transistors are in the non-conducting or "off" state, charge is prevented from flowing from Input Voltage Source 10 to Impedance 27. However, the boundary condition of an inductance (i.e., Impedance 21) is such that a discontinuity of current cannot take place. To avoid the current discontinuity in the Impedance (inductance) 21, current is drawn through Diode 20 when Transistors 15 and 16 are switched from the conducting to non-conducting state.

Transistor 17 controls the state of conduction of the power Transistors 15 and 16. Transistor 17, in turn, is controlled by the output of Operation Amplifier 25. The output of Operational Amplifier 25 is determined by the relationship between the voltage applied to the two input terminals. One of the input terminals is held at a voltage determined by the Reference Voltage Source 30 and the Resistance Dividing Network 29. The Resistance Dividing Network 29 must be arranged so as not to load Reference Voltage Source 30 while simultaneously having a low enough impedance to drive the Operational Amplifier 25.

The voltage of the other input terminal of the Operational Amplifier 25 is determined, ignoring in the present discussion the circuit branch comprised of Impedances 22 and 23, by the resistance dividing network comprised of Impedance 24 and Impedance 26. (The values of Impedance 13 and Impedance 14 are chosen to be negligible compared to Impedance 24.) Impedances 24 and 26 establish the excursion of the output Terminal Voltage $V_{28}$ from the reference voltage $V_0$ of the first terminal of Operation Amplifier 25, before the power transistors are switched to the alternative state of conduction.

The switching process can be understood by assuming that the output terminal of the Operational Amplifier 25 is at $V_{MIN}$, the minimum potential relative to the Common Terminal 11 attainable by the output terminal (in the preferred embodiment this potential is approximately 7 volts). The voltage at the second input terminal of the Operational Amplifier 25 takes the value $[V_{MIN} + (V_{28} - V_{MIN}) \times (R_{24}/R_{24} + R_{26})]$. $R_{25}$ and $R_{26}$ are the resistance values of impedances 24 and 26 respectively. This value is less than the reference voltage $V_0$ at the first input terminal of the Operational Amplifier.

When the Operational Amplifier 25 output voltage is $V_{MIN}$, Power Transistors 15 and 16 are maintained in the conducting state; and charge is stored on Impedance (capacitance) 27 so that $V_{28}$ increases.

At some time, $[V_{MIN} + (V_{28} - V_{MIN})(R_{24}/R_{24} + R_{26})] = V_0$. This voltage level at the second input terminal of the Operational Amplifier changes output voltage of the Operational Amplifier to the maximum value permitted by the circuit, $V_{MAX}$ (approximately the potential of Input Voltage Source 10 or 24 volts). The second terminal of Operation Amplifier 25 assumes a value approximately equal $V_{MAX} + (V_{28} - V_{MAX}) \cdot (R_{24}/R_{24} + R_{26})$. In addition when the output voltage of Operational Amplifier 25 is at $V_{MAX}$, the power Transistors 15 and 16 are changed to a non-conducting state. Immediately after the change of the state of conduction, the current flowing through 21 is maintained instantaneously (i.e. by the inductance). The current flow and therefore $V_{28}$ decreases. The decrease in $V_{28}$ continues until $V_{MAX} + (V_{28} - V_{MAX})(R_{24}/R_{26} + R_{24}) = V_0$. At that voltage level, the output voltage of the Operational Amplifier assumes the value $V_{MIN}$, the (power) Transistors are switched on and the cycle is repeated.

The regulation of $V_{28}$ thus occurs about the value of reference terminal voltage of $V_0 + D_1$, the (power) Transistors 15 and 16 is changed to a non-conduction state from a conducting state. At some value of $V_{28}$ below the reference terminal voltage $V_0 - D_2$, the (power) Transistors 15 and 16 are switched from a non-conducting state to a conducting state. From the previous discussion $D_1 = R_{26}/R_{24}(V_0 - V_{MIN})$ and $D_2 = R_{26}/R_{24}(V_0 - V_{MAX})$.

During the change of state of conduction of the (power) Transistors 15 and 16, relatively large transient pulses can be generated which through the feedback paths, can cause a plurality of state changes per cycle. These changes of state, not only disrupt the voltage output regulation, but cause increased power loss and are potentially harmful to the transistors. Furthermore, the feedback loop can attempt to operate in an intermediate region of the power transistor characteristics causing undesirable power losses.

To minimize the aforementioned deleterious effects the Impedances 22 and 23 are added in a parallel circuit branch between the output terminal and the second input terminal of the Operational Amplifier 25. Impedance 22 is a capacitive element, while Impedance 23 is a resistive element. The boundary conditions of a capacitive element are such that the voltage across the element can not be altered instantaneously, but must await the addition or removal of charge. Thus, when the output voltage of Operational Amplifier 25 changes between $V_{MAX}$ and $V_{MIN}$, the effect on the second input terminal is to cause an increased voltage change of the Operational Amplifier 25, resulting from the stored charge on Impedance 22. However, the charge on Impedance (capacitor) 22 is altered at a rate determined by the RC time constant of the circuit. In the preferred embodiment, the voltage value at the second input of Operational Amplifier 25 asymptotically approaches the value without the parallel circuit (i.e., containing Impedances 22 and 23) in the feedback of the Operational Amplifier 25. The behavior of the actual output voltage $V_{28}$ (solid curve) and the output voltage necessary for a change of state of conduction is shown in FIG. 3.

Values for the impedance components of the preferred embodiment are given in Table 1, however one skilled in the art could readily substitute other values or even other components without departing from the spirit and scope of the invention, Impedance 2 has a value of capacitance allowing the RC time constant to be small enough to permit adequate regulation of $V_{28}$, but large enough to minimize the effect of transient voltage pulses. The requirements of the Resistance Dividing Network 29 have been discussed above.

TABLE 1

IMPEDANCE

| NUMBER | TYPE | MAGNITUDE |
|---|---|---|
| 13 | Resistor | $1.5 \times 10^3 \Omega$ |
| 14 | Resistor | $27 \Omega$ |
| 18 | Resistor | $0.7 \Omega$ |
| 19 | Resistor | $680 \Omega$ |
| 21 | Inductor | $1 \times 10^{-3}$ H |
| 22 | Capacitor | See text |
| 23 | Resistor | $330 \times 10^3 \Omega$ |
| 24 | Resistor | $1 \times 10^6 \Omega$ |
| 26 | Resistor | $1 \times 1^3 \Omega$ |
| 27 | Capacitor | $11,000 \times 10^{-6}$ F |
| 28 | Capacitor | $1 \times 10^{-6}$ F |
| 29 | Resistor | See text |

The above description is included to illustrate the operation of the preferred embodiment and is not meant to limit the scope of the invention. The scope of the invention is to be limited only by the following claims. From the above discussion, many variations will be apparent to one skilled in the art that would be encompassed by the spirit and scope of the invention.

What is claimed is:

1. In a power supply, energized at an input terminal by an external d.c. power source and providing regulated d.c. voltage at an output terminal, the combination comprising:

controllable switch means coupled to said input terminal and said output terminal, said switch means providing a state of conduction between said terminals in response to a first control signal, said switch means providing a state of non-conduction in response to a second control signal;

first signal generating means coupled to said switch means, said first signal means producing a first steady signal when said switch means is in said state of conduction, said first signal means producing a second steady signal when said switch means is in said state of non-conduction;

second signal generating means coupled to said switch means for producing a first transient signal when said switch means changes from said state of non-conduction to said state of conduction, said second signal means producing a second transient signal when said switch means changes from said state of conduction to said state of non-conduction; and comparison means coupled to said first signal generating means, second signal generating means, said output terminal and said switch means, said comprison means producing said first control signal when said output terminal voltage falls below a first value determined by a combination of said second steady signal and said second transient signal, said comparison means producing said second control signal when said output terminal voltage exceeds a value determined by a combination of said first steady signal, and said first transient signal.

2. The combination of claim 1, further including an inductor and a diode, said inductor coupled to said switch means and to said output terminal for providing a potential drop between said switch means and said output terminal, said diode coupled between said switch means and ground potential for providing a continuous current when said switch means changes from said state of conduction to said state of non-conduction.

3. The combination of claim 2, further including capacitor means coupled to said output terminal for storing charge when said switch means is in said state of conduction, and for delivering charge to said output terminal when said switch means is in a state of non-conduction.

4. The combination of claim 3 wherein said switch means includes transistor elements.

5. An improved switching power supply of the type having a storage capacitance, dropping impedance, switch means, and feedback circuit for changing the state of conduction to a state of non-conduction and vice versa of said switch means in response to a comparison of an output voltage of said power supply with a reference voltage. wherein the improvement comprises:

circuit means coupled to said feedback circuit, said circuit means providing a transient signal to said feedback circuit after a change in the state of said switch means, said transient signal preventing said feedback circuit from causing said change in the state of conduction of said switching circuits for a predetermined interval.

6. The improved power supply of claim 5 wherein said circuit means includes a control capacitor and a control resistor, a change of charge on said control capacitor causing said transient signal to be applied to said feedback circuit said predetermined interval established by values of said control capacitor and said control resistor.

7. In a power supply, energized at an input terminal by a d.c. power source and supplying a regulated d.c. voltage at an output terminal, the combination comprising:

controllable switch means coupled to said input terminal and said output terminal, said switch means having a state of conduction and a state of non-conduction;

feedback means coupled to said switch means and to said output terminal, said feedback means causing said switch means to change to said conducting state when said output terminal voltage falls below a first signal levels said feedback means causing said switch means to change to said non-conducting state when said output terminal voltage vises above a second signal level; and circuit means coupled to said feedback means, said circuit means temporarily decreasing said first signal level immediately after said switch means changes to said non-conducting state, said circuit means temporarily increasig said second signal level immediately after said switch means changes to said conducting state.

8. The combination of claim 7 wherein said switch means comprises a npn power transistor, a pnp power transistor wherein a collector of said pnp power transistor is coupled to a base of said npn power transistor, and a pnp control transistor is coupled to a base of said pnp power transistor.

9. The combination of claim 8 further including an inductor coupled between said switch means and said output terminal, and a diode coupled between said inductor and a common potential.

10. The combination of claim 9 wherein said feedback means includes an amplifier with a resistor feedback circuit.

11. The combination of claim 10 wherein said circuit means includes a capacitor, wherein charge stored on the capacitor causes said decrease in said first signal level and said increase in said second signal.

* * * * *

UNITED STATES PATENT OFFICE
CERTIFICATE OF CORRECTION

Patent No. 3,781,642　　　　　Dated December 25, 1973

Inventor(s) David R. Dutton

It is certified that error appears in the above-identified patent and that said Letters Patent are hereby corrected as shown below:

Column 8, line 16, delete "increasig" and insert --increasing--.

Signed and sealed this 25th day of June 1974.

(SEAL)
Attest:

EDWARD M. FLETCHER, JR.
Attesting Officer

C. MARSHALL DANN
Commissioner of Patents